United States Patent Office 3,162,684
Patented Dec. 22, 1964

3,162,684
NEW AMINOBENZOIC ACID DERIVATIVES AND COMPOSITIONS CONTAINING SAME
Wilhelm Ernst Frick, Pfeffingen, Basel-Land, and Walter Stammbach, Basel, Switzerland, assignors to J. R. Geigy A.-G., Basel, Switzerland
No Drawing. Filed Mar. 7, 1962, Ser. No. 177,976
Claims priority, application Switzerland, Dec. 24, 1957
54,113
11 Claims. (Cl. 260—556)

The present invention relates to new derivatives of the aminobenzoic acids and more particularly to derivatives of N-sulphonated aminobenzoic acid arylamides and methods of making the same.

The invention also relates to compositions for combatting injurious insects containing these active aminobenzoic acid derivatives. The present invention can be broken down into two aspects.

In one aspect of the invention, it relates to new compounds of the structural formula

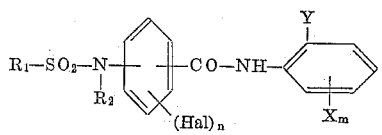

I wherein $R_1$ represents a member selected from the group consisting of chlorine-substituted lower alkyl radicals, chlorinated phenyl radicals and chlorinated benzyl radicals, $R_2$ represents a member selected from the group consisting of hydrogen and lower alkyl radicals, X independently in each occurrence represents a member selected from the group consisting of chlorine and trifluoromethyl, $m$ is an integer from 1 to 3, Y represents a member selected from the group consisting of hydrogen, chlorinated phenoxy and chlorinated phenyl-mercapto radicals, Hal represents an atom selected from the group consisting of chlorine and bromine, $n$ is an integer from 0 to 3, and the total sum of substituents on the different aromatic nuclei in the molecule is at least 3 and at most 7.

The compounds of above Formula I have an excellent insecticidal activity in particular against insects in all stages of their development which injure keratine material, such as moth larvae and larvae of furniture carpet beetle (*Anthrenus vorax*) and black carpet beetle (*Attagenus piceus*).

Preferred compounds of the above Formula I are those in which "Hal" is chlorine. When in this formula "$m$" is 1, X is advantageously chlorine, but more than one X is present, at least one of them can be the trifluoromethyl group. The action of the trifluoromethyl radical is equivalent to that of a halogen atom so that the one can be exchanged for the other. If the molecule contains a trifluoromethyl radical as substituent X, advantageously other radicals X are chlorine. Very active compounds are those in which the radical Y is a hydrogen atom.

Of particular interest with regard to their easy production and good activity are the derivatives of anthranilic acid (ortho-aminobenzoic acid) and of meta-aminobenzoic acid which are embraced by the Formula I defined above. Preferred compounds of the Formula I are in particular those in which $R_1$ represents a phenyl radical substituted by one or more chlorine atoms. In addition to chlorine, this phenyl radical $R_1$ can also advantageously contain at least one trifluoromethyl group as substituent. Also para-aminobenzoic acid derivatives having a chlorinated phenyl radical $R_1$ have good activity.

Thus, preferred compounds have the general formula

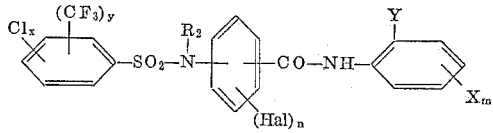

in which $R_2$, Hal, $n$, Y, X and $m$ have the meanings given above, $x$ is a number from 1 to 3 and $y$ is 0 or 1. The total sum of chlorine and trifluoromethyl substituents on the different aromatic nuclei must be greater than 2 and should advantageously be at least 4.

Chlorine-substituted lower alkyl radicals $R_1$ are those with 1–4 carbon atoms such as chloromethyl, α- or β-chlorethyl, α-chloropropyl, α-chlorobutyl, dichloromethyl and trichloromethyl.

If the radical R is not hydrogen, it is advantageously a lower alkyl radical such as methyl, ethyl, isopropyl and butyl.

The new compounds of the Formula I defined above can be produced by reacting an aminobenzoic acid arylamide of the general formula

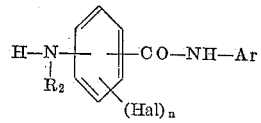

II with a reactive functional derivative, in particular a halide, of a sulphonic acid of the general formula

    III wherein $R_1$, $R_2$, Ar, Hal and $n$ have the meanings given above. In this reaction the starting components are so chosen that in all at least 3 halogen atoms and/or $CF_3$ groups are ring substituents in the reaction product.

A further process for the production of compounds of the general Formula I consists in reacting, in the presence of an acid binding agent, a reactive functional derivative, in particular a halide, of a sulphonylaminobenzoic acid of the general formula

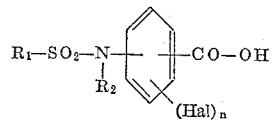

IV with an amine of the general formula $$H_2N\text{---}Ar \qquad V$$

wherein $R_1$, $R_2$, Ar, Hal and $n$ have the meanings given above, the reaction components being so chosen that there are, in all, at least 3 halogen atoms and/or $CF_3$ groups as ring substituents in the reaction product.

In general those reaction components of the general Formulae II–V are chosen as starting materials which produce reaction products having in all at least three halogen atoms and/or $CF_3$ groups as ring substituents. However, also pairs of starting materials can be used which contain either no, or together less than three halogen atoms or $CF_3$ groups as ring substituents. Thus for example, reaction products which correspond to the general formula

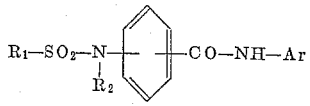

VI wherein the symbols Ar, $R_1$ and $R_2$ have the meanings given above but which contain no or in all less than three halogen atoms and/or $CF_3$ groups in the benzoic acid radical and in the radical Ar or in an aromatic radical $R_1$, can be treated with chlorine or bromine until as many chlorine or bromine atoms have entered the molecule as nuclear substituents that the total sum of halogen atoms and $CF_3$ groups bound at the aromatic nuclei in the molecule of the end product is greater than 2. If desired, reaction products which already contain the necessary sum of at least three nuclear bound halogen atoms and $CF_3$ groups, can be treated with chlorine or bromine in order to increase the halogen content.

Then, if desired, in reaction products obtained by one of the production processes, any hydrogen atoms $R_2$ can be replaced by alkyl radicals either by reacting the reaction products, in the presence of acid binding agents or after conversion into their mono- or di-alkali compounds, with reactive esters of a lower aliphatic alcohol, e.g. with an alkyl halide.

Starting materials of the general Formula II for the production process first above mentioned are obtained for example from, if desired, halogen substituted, nitrobenzoic acids by converting them into their acid chlorides, reacting the latter with arylamines of the general Formula V which may be substituted in the nucleus to form the corresponding nitrobenzoic acid arylamides and reducing these to the corresponding aminobenzoic acid arylamides. These can then also be chlorinated or brominated in the nuclei.

The processes for the obtention of starting materials of the general Formula IV for the second production process depend to some extent on the position of the amino group to the carboxyl group of the aminobenzoic acids and on the position of the halogen substituents to the amino group. The compounds m-aminobenzoic acid, p-aminobenzoic acid and the substitution products thereof, like the unsubstituted anthranilic acid and some nuclear halogenated and/or N-monoalkylated anthranilic acids, can be acylated by reaction with acid halides of sulphonic acids of the general Formula III, whereupon the N-acyl derivatives of aminobenzoic acids, possibly after nuclear halogenation, are converted into reactive functional derivatives with regard to the carboxyl group, for example into acid halides.

Halogen anthranilic acids having a halogen atom in the o-position to the amino group such as 3,5-dichloranthranilic acid, are difficult to N-acylate. On the other hand, halogenated anthranilic acids as well as anthranilic acid itself and N-monoalkylated derivatives thereof can be converted into possibly nuclear halogenated and/or N-alkylated isatoic acid anhydrides by treatment with phosgene, and these anhydrides can be reacted with arylamines of the general Formula V to form starting materials of the general Formula II for the first production process mentioned. If desired, the substances so obtained can then be halogenated in the nucleus. The isatoic acid anhydrides necessary for this can be obtained for example also by reacting possibly nuclear halogenated phthalic acid monoamides or imides according to Hoffmann, i.e. isatoic acid anhydrides which are also obtained from phthalic acid derivatives but in one instead of two steps, so avoiding treatment with phosgene.

Examples of suitable starting materials of the general Formula II are the arylamides as defined of anthranilic acid, 4-chloranthranilic acid, 5-chloranthranilic acid, 3,5-dichloranthranilic acid, 4,5-dichloranthranilic acid, 4,6-dichloranthranilic acid, 3,4,5-trichloranthranilic acid, 3,4,5,6-tetrachloranthranilic acid, 5-bromanthranilic acid, 3,5-dibromanthranilic acid, N-methyl-4,5-dichloranthranilic acid, N-ethyl-4,5-dichloranthranilic acid, N-methyl- and N-ethyl- 3,5-dichloranthranilic acid, N-methyl- and N-ethyl-4,6-dichloranthranilic acid, N-methyl-4,6-dichloranthranilic acid, 3-aminobenzoic acid, 3-amino-4-chloro, 3-amino-4-bromo-, 3 amino-4,5-dichloro-, 3 - amino - 4,6 - dichloro-, 3-amino-2,4,5-trichloro- and 3-amino-2,4,6-trichloro-benzoic acid, 4-aminobenzoic acid, 4-amino-3-chloro- and 4-amino-3,5-dichloro-benzoic acid.

The amine components in these amides can be represented for example by the following amines of the general Formula V: aniline, 2-chloro-, 3-chloro- and 4-chloroaniline, 3,4-dichloraniline and other dichloranilines, 2,4,5-trichloraniline, 3,4,5-trichloraniline, 2,3,4,5-tetrachloraniline, 3-chloro-4-bromaniline, 3,4-dibromaniline, 3-trifluoromethyl-4-chloraniline, 2-chloro-5-trifluoromethyl aniline, 2,5-dichloro-4-trifluoromethyl aniline, 2-methoxy-3,4,5-trichloraniline, 2-methyl-4,5-dichloraniline, mono- and poly-chlorinated 2-, 3- and 4-aminodiphenyl ethers and 2-aminodiphenyl sulphides such as e.g. 2-amino-4,4'-dichlorodiphenyl ether, 3-amino-4,4'dichlorodiphenyl ether, 2-amino-4,2',4',5'-tetrachlorodiphenyl ether, 2-amino-4,5,2',4',6'-pentachlorodiphenyl ether and 2-amino-4-trifluoromethyl-2',4',5'-trichlorodiphenyl ether as well as 2-amino-4,4'-dichlorodipheyl sulphide.

Examples of reactive functional derivatives of sulphonic acids of the general Formula III are chloromethane sulphochloride, $\alpha$- and $\beta$-chlorethane and $\alpha$-chlorobutane sulphochlorides, dichloromethane, trichloromethane and trifluoromethane sulphochlorides, 4-chlorobenzene, 3,4-dichlorobenzene and 3-trifluoromethyl-4-chlorobenzene sulphochlorides, 2,4,5-trichlorobenzene sulphochloride and 4-chloro- and 3,4-dichloro-$\alpha$-toluene sulphochlorides.

Starting materials of the general Formula IV are for example the chlorides of aminobenzoic acids substituted at the nitrogen atom by the radical of a sulphochloride mentioned above. Examples of aminobenzoic acids from which such N-sulphonyl derivatives are derived have been given as acid components of amides of the general Formula II. Arylamines of the general Formula V suitable as starting materials have already been listed as amine components of amides of the general Formula II.

Starting materials of the general Formula VI for the third production process mentioned are obtained if, analogously to the first or second production processes, pairs of starting materials of the general Formulae II and III or IV and V are reacted together which pairs of starting materials contain no or only a few halogen atoms as substituents.

The following examples further illustrates the production of the new compounds according to the first aspect of the invention. Parts are given as parts by weight and their relationship to parts by volume is as that of grammes to cubic centimetres. The temperatures are in degrees centigrade.

EXAMPLE 1

(a) 3,5-Dichlorisatoic Acid Anyhdride 206 parts of 3,5-dichloranthranilic acid are suspended in 1500 parts by volume of chlorobenzene. 150 parts of phosgene are introduced into this suspension at 120°. The reaction mixture is then refluxed for some hours and then cooled to room temperature. The greater part of the 3,5-dichlorisatoic acid anhydride crystallises out of the chlorobenzene solution and can be filtered off. After drying in the vacuum at about 100°, it decomposes at about 250°. A further amount of a less pure product can be obtained by concentrating the mother liquor.

(b) 2-Amino-3,5-Dichlorobenzoic Acid-3',4'-Dichloranilide 232 parts of 3,5-dichlorisatoic acid anhydride are added at about 100° to a solution of 162 parts of 3,4-dichloraniline in 200 parts by volume of chlorobenzene. The reaction mixture is then refluxed for four hours and then cooled to room temperature. The greater part of the 2-amino-3,5-dichlorobenzoic acid-3',4'-dichloranilide precipitates. It is filtered off and dried in the vacuum at about 100°. The crude product melts at about 190-200°. The compound can be obtained in a pure state by recrystallizing from chlorobenzene when it then melts at 206–208°.

(c) 2-(3',4'-Dichlorobenzene Sulphonamido)-3,5-Dichlorobenzoic Acid-3'',4''-Dichloranilide 350 parts of 2-amino-3,5-dichlorobenzoic acid-3',4'-dichloranilide are suspended in 1500 parts of butanone. 400 parts by volume of concentrated (40%) caustic soda lye and 400 parts of water are added whereupon the 2-amino-3,5-dichlorobenzoic acid-3',4'-dichloranilide gradually almost completely dissolves. At about 25–30°, 300 parts of 3,4-dichlorobenzene sulphochloride are slowly added dropwise. The reaction mixture is stirred for some hours and then the product is worked up as follows:

The solvent is removed by steam distillation and the residue is dissolved in about 6000 parts of water. The alkaline solution is treated with animal charcoal and filtered. The 2-(3',4'-dichlorobenzene sulphonamido)-3,5-dichlorobenzoic acid-3'',4''-dichloranilide can be precipitated by acidifying the filtrate. It is filtered off, washed with water and dried in the vacuum at about 100°.

The crude compound melts at about 250–255°. The substance can be obtained in a pure form by recrystallisation from chlorobenzene; it then melts at 263–264°.

(d) 2-(3',4'-Dichlorobenzene Sulphone Methylamido) 3,5-Dichlorobenzoic Acid-3'',4''-Dichloranilide 505 parts of the compound described under (c) are dissolved in 140 parts of concentrated caustic soda lye, 2000 parts of water and 1500 parts of alcohol. The mixture is heated to 70° and 300 parts of dimethyl sulphate are added. Concentrated caustic soda lye is continually added so that the reaction remains alkaline. After about 5 hours, the precipitated reaction product is filtered off under suction, washed neutral with water and dried in the vacuum at about 100°.

The crude compound melts at about 210° whereas the 2-(3',4'-dichlorobenzene sulphone methylamido)-3,5-dichlorobenzoic acid-3'',4''-dichloranilide obtained by recrystalisation from chlorobenzene, melts at 216–217.5°.

EXAMPLE 2

(a) 3,4-Dichlorobenzene Sulphone Anthranilide 137 parts of anthranilic acid are suspended in 1500 parts of water and 500 parts of concentrated caustic soda lye (40%) are added. 300 parts of 3,4-dichlorobenzene sulphochloride are added to the solution while stirring energetically at about 60°. The reaction mixture is kept for some hours at 60° and then cooled. The 3,4-dichlorobenzene sulphone anthranilide can be precipitated with concentrated hydrochloric acid. It is filtered off, washed neutral with water and dried at 100° in the vacuum.

The crude product melts at about 170–175°. It can be recrystallised from methanol and water and is then obtained in a completely pure state. The pure compound melts at 180–182°.

(b) 2-(3',4'-Dichlorobenzene Sulphonamido)-Benzoyl Chloride 346 parts of 3,4-dichlorobenzene sulphone anthranilide are suspended in 2100 parts by volume of benzene and 300 parts of phosphorus pentachloride are added at about 40°. There is strong development of hydrochloric acid gas and a complete solution is obtained. The reaction mixture is kept for some hours at 40° and then cooled to 10° whereupon the 2-(3',4'-dichlorobenzene sulphonamido)-benzoyl chloride almost completely crystallises out. It is filtered off and washed first with benzene and then with petroleum ether. After drying at 80° in the vacuum, the chloride melts at 121–123°.

(c) 2-(3',4'-Dichlorobenzene Sulphonamido)-Benzoic Acid-2'',4'',5''-Trichloranilide 365 parts of 2-(3',4'-dichlorobenzene sulphonamido)-benzoyl chloride are dissolved in 1500 parts by volume of benzene and the solution is added at about 20° to 400 parts of 2,4,5-trichloraniline. The reaction mixture is then left to itself until no more trichloraniline hydrochloride is formed. The reaction is completed in about 10 hours at 20–25°. 1000 parts of 2 N-sodium carbonate solution are then added to the reaction mixture whereupon the trichloraniline is dissolved and the 2-(3',4'-dichlorobenzene sulphonamido)-benzoic acid-2'',4'',5''-trichloranilide precipitates in the form of the sodium salt. It is filtered off, suspended in about 1000 parts of water and the free sulphonamide is precipitated with hydrochloric acid. It is filtered off under suction, washed neutral with water and dried in the vacuum at about 100°. The crude product melts at about 170–175°. The compound can be recrystallised from chlorobenzene whereupon the pure product melts at 179–180°.

(d) Chlorination of 2-(3',4'-Dichlorobenzene Sulphonamido)-Benzoic Acid-2'',4'',5''-Trichloranilide Although the action of 2-(3',4'-dichlorobenzene sulphonamido)-benzoic acid-2'',4'',5''-trichloranilide is quite satisfactory, it can be increased by further chlorination in the benzoic acid radical. 525 parts of 2-(3',4'-dichlorobenzene sulphonamido)-benzoic acid-2'',4'',5''-trichloranilide are suspended 10,000 parts of glacial acetic acid and 71 parts of chlorine are introduced at about 50°. After cooling, the reatcion product is filtered off and dried at 100° in the vacuum. The crude product melts at 190–200°. On recrystallising from chlorobenzene, the pure 2-(3',4'dichlorobenzene sulphonamido)-5-chlorobenzoic acid-2'',4'',5''-trichloroanilide (M.P. 216–217°) can be obtained.

EXAMPLE 3

(a) 3-Amino-4-Chlorobenzoic Acid-2',4',5'-Trichloranilide 196 parts of 2,4,5-trichloraniline are dissolved in 750 parts by volume of chlorobenzene. The solution is heated to 60° at which temperature a solution of 220 parts of 3-nitro-4-chlorobenzoyl chloride in 750 parts of chlorobenzene is added.

The reaction mixture is refluxed until the theoretical amount of hydrochloric acid gas has developed, which is for about 15 hours. On cooling, the 3-nitro-4-chloro-2',4',5'-trichloranilide completely precipitates. It is filtered off and dried in the vacuum at about 10°. The crude nitro compound melts at about 185–190°. It can be obtained in a pure form by recrystallising from ethyl acetate; the exact melting point is then 197–199°.

The crude nitro compound is reduced by the usual methods, for example by catalytic hydrogenation with the help of Raney nickel or with iron and hydrochloric acid according to Béchamp. The 3-amino-4-chlorobenzoic acid 2',4',5'-trichloranilide obtained in this manner melts, after purification by recrystallisation from chlorobenzene, at 198–200°.

(b) 3-(3'-Trifluoromethyl-4'-Chlorobenzene Sulphonamido)-4-Chlorobenzoic Acid-2'',4'',5''-Trichloranilide 350 parts of 3-amino-4-chlorobenzoic acid-2',4',5'-trichloranilide are dissolved in 1500 parts by volume of pyridine. 279 parts of 3 - trifluoromethyl-3-chlorobenzene sulphonic acid chloride are added dropwise to this solution at a temperature of between 0 and 10°. The temperature is then raised, within several hours, to 60–70° and the mixture is kept for another 8–10 hours at this temperature to complete the reaction. After the addition of 100 parts of concentrated caustic soda lye (40%), the reaction mixture is distilled with steam. The alkaline residue, from which the pyridine has been liberated, is then filtered and the filtrate is made acid with Congo paper with hydrochloric acid. The precipitate is 3-(3'-trifluoromethyl-4'-chlorobenzene sulphonamido)-4-chlorobenzoic acid-2'',4'',5''-trichloranilide. It is filtered off, washed neutral with water and dried in the vacuum at about 100°. The crude product melts at about 180–195°. It is purified by recrystallisation from ligroin. The pure compound melts at 191–193°.

The following compounds can be produced for example in an analogous manner to those described in the above examples: 2-(3',4'-dichlorobenzene sulphonamido)-benzoic acid-3",4"-dichloranilide M.P. 207–209°, 2-(3',4'-dichlorobenzene sulphone methylamido)-benzoic acid-3",4"-dichloranilide M.P. 144–145°, 2-(3',4'-dichlorobenzene sulphonamido)-5-chlorobenzoic acid-4"-chloranilide M.P. 221–222°, 2-(3',4'-dichlorobenzene sulphonamido)-5-chlorobenzoic acid-3",4"-dichloranilide M.P. 221–222°, 2-(2',4',5'-trichlorobenzene sulphonamido)-5-chlorobenzoic acid-3",4"-dichloranilide M.P. 216–218°, 2-(4-chloro-α-toluene sulphonamido)-3,5-dichlorobenzoic acid-3",4"-dichloranilide M.P. 238–240°, 2-(3',4'-dichloro-α-toluene sulphonamido)-3,5-dichlorobenzoic acid-3",4"-dichloranilide M.P. 224–225°, 2-chloromethane sulphonamido-3,5-dichlorobenzoic acid-3',4'-dichloranilide M.P. 261–263°, 2-(3'-trifluoromethyl-4'-chlorobenzene sulphonamido)-3,5-dichlorobenzoic acid-3",4"-dichloranilide M.P. 242–243°, 2-(3',4'-dichlorobenzene sulphonamido)-4,5-dichlorobenzoic acid-3",4"-dichloranilide M.P. 205–206°, 3-chloromethane sulphonamido-4-chlorobenzoic acid-3'-trifluoromethyl-4'-chloranilide M.P. 166–168°, 3-(3',4'-dichlorobenzene sulphonamido)-4-chlorobenzoic acid-(3",4"-dichloranilide M.P. 222–224°, 3-(3',4'-dichlorobenzene sulphonamido)-4-chlorobenzoic acid-2",4',5"-trichloranilide M.P. 198–201°, 3-(3',4'-dichlorobenzene sulphonamido)-4-chlorobenzoic acid-3"-trifluoromethyl-4"-chloranilide, M.P. 192–195°, 3-(3',4'-dichlorobenzene sulphone methylamido)-4-chlorobenzoic acid-3"-trifluoromethyl-4"-chloranilide, M.P. 197–199°, 3-(3'-trifluoromethyl-4'-chlorobenzene sulphonamido)-4-chlorobenzoic acid-3",4"-dichloranilide M.P. 215–217°, 3-(3'-trifluoromethyl-4'-chlorobenzene sulphonamido)-4-chlorobenzoic acid-3"-trifluoromethyl-4"-chloranilide M.P. 195–197°, 3-(3'-trifluoromethyl-4'-chlorobenzene sulphone methylamido)-4-chlorobenzoic acid-3"-trifluoromethyl-4"-chloranilide, M.P. 217–220°, 3-(3'-trifluoromethyl-4'-chlorobenzene sulphonamido)-4-bromobenzoic acid-3"-trifluoromethyl-4"-chloranilide M.P. 169–172°, 3-chloromethane sulphonamido-4-benzoic acid-2',4'5'-trichloranilide M.P. 196–198°, 3-(4'-chlorobenzene sulphonamido)-4-chlorobenzoic acid-2",3"4,"-trichloranilide M.P. 198–200°, 3-(3'4'-dichlorobenzene sulphonamido)-4-chlorobenzoic acid-2",3",4"-trichloranilide M.P. 206–209°, 3-(3' - trifluoromethyl-4'-chlorobenzene sulphonamido)-4-chlorobenzoic acid-2",3",4"-trichloranilide M.P. 210–213°, 3-(3',4'-dichlorobenzene sulphonamido)-4-chlorobenzoic acid-3",4",5"-trichloranilide M.P. 240–242°, 3-(3' - trifluoromethyl-4'-chlorobenzene sulphonamido)-4-chlorobenzoic acid - 3",4",5"-trichloranilide M.P. 221–223°, 3-(3',4'-dichlorobenzene sulphonamido)-4-bromobenzoic acid-3"-trifluoromethyl-4"-chloranilide M.P. 141–143°, 3-(3'-trifluoromethyl-4'-chlorobenzene-sulphonamido)-4-chlorobenzoic acid - 2" - (4'"-chlorophenoxy)-5"-chloranilide M.P. 134–138°, 3-(3'-trifluoromethyl-4'-chlorobenzene sulphonamido) - 4-chlorobenzoic acid-2"-(2'",4'",5'"-trichlorophenoxy)-5"-trifluoromethyl anilide M.P. 159–161°, 3-(3',4'-dichlorobenzene sulphonamido)-4-chlorobenzoic acid-2"-(4'"-chlorophenylmercapto)-5"-chloranilide M.P. 162–164°, 3-(3'-trifluoromethyl-4'-chlorobenzene sulphonamido)-4-chlorobenzoic acid-2"-(4'"-chlorophenylmercapto)-5"-chloranilide M.P. 158–160°, 3-chloromethane sulphonamido-4,6-dichlorobenzoic acid - 2'4'5'-trichloranilide M.P. 216–218°, 3-(3',4'-dichlorobenzene sulphonamido)-4,6-dichlorobenzoic acid-2",4",5"-trichloranilide M.P. 244–246°, 3-(3',4'-dichlorobenzene sulphonamido)-4,6-dichlorobenzoic acid-3"-trifluoromethyl-4"-chloroanilide M.P. 170–172°, 3-(3'-trifluoromethyl-4'-chlorobenzene sulphonamido-4,6-dichlorobenzoic acid-3",4"-dichloranilide M.P. 158–160°, 3-(3'-trifluoromethyl-4'-chlorobenzene sulphonamido)-4,6-dichlorobenzoic acid-2",4",5"-trichloranilide M.P. 189–191°, 3-(3'-trifluoromethyl-4'-chlorobenzene sulphonamido)-4,6-dichlorobenzoic acid-3"-trifluoromethyl-4"-chloranilide M.P. 172–173°, 3-(3'-trifluoromethyl-4'-chlorobenzene sulphone methylamido)-4,6-dichlorobenzoic acid-2",4",5"-trichloranilide M.P. 179–182°, 3-(3'-trifluoromethyl-4'-chlorobenzene sulphone ethylamido)-4,6-dichlorobenzoic acid - 2",4",5"-trichloranilide M.P. 175–177°, 3-(3'-trifluoromethyl-4'-chlorobenzene sulphone-n-butylamido)-4,6-dichlorobenzoic acid12",4",5"-trichloranilide M.P. 163–165°, 4-(3'-trifluoromethyl-4'-chlorobenzene sulphonamido)-benzoic acid-3"-trifluoromethyl-4"-chloranilide M.P. 205–208°, 4-(3',4'-dichlorobenzene sulphonamido)-benzoic acid-3"-trifluoromethyl-4"-chloranilide M.P. 227–229°, and 4-(3',4'-dichlorobenzene sulphonamido)-3-chlorobenzoic acid-3"-trifluoromethyl-4"-chloranilide M.P. 210–213°.

The compounds of Formula I which can be produced according to the processes described can be used according to the usual methods for textile finishing. They have considerable affinity to keratine material and are excellently suitable, therefore, for the protection of keratine material against injurious insects, in particular for the wash and moth proof finishing of such materials both in the raw as well as in the processed state, for example of raw or processed sheep's wool as well as other animal hairs, felts and furs. In addition to the wash and moth proof finishing in the dyebath, the compounds can also be used for the impregnation of wool or woolen articles, the materials then becoming equally excellently moth proofed.

In addition to their insecticidal action on the larvae of the clothes moth, the compounds of Formula I are also active against the larvae of the black carpet and furniture carpet beetles so that the textiles, such as woolen blankets, woolen carpets, woolen underwear, woolen clothes and knitted goods treated with the compounds according to this first aspect by one or the other of these methods, are protected from all types of insects which are injurious to keratine material.

The agents used for the protection of keratine material against attack by injurious insects should contain the active ingredients of the formula I in a finely distributed form. Thus, solutions, suspensions and emulsions of the active ingredients should be used.

Insofar as the active ingredients contain a hydrogen atom in the sulphonamide group, i.e. when $R_2$ is a hydrogen atom, in the form of their alkali metal salts they have good water solubility. They can be applied to the keratine material direct from these aqueous solutions either by dipping the material for a shorter or longer time in the alkali metal salt solutions, or spraying them with the solutions, or by treating them in the solutions at a raised temperature as in dyeing processes.

Compounds having no dissociating hydrogen atom in the sulphonamide group can be drawn onto the material to be protected for example from their aqueous suspensions or emulsions, advantageously at a raised temperature, or such suspensions or emulsions can be used for spraying the material.

Because of their improved solubility in organic solvents, these compounds are particularly well suited for application from non-aqueous media. Thus the materials to be protected can simply be impregnated with these solutions or, if a suitable solvent is chosen, the moth proof finishing can be combined with a dry cleaning process.

Propylene glycol, methyl cellosolve, ethyl cellosolve and dimethyl formamide have proved to be particularly suitable organic solvents to which distributing agents and/or other auxiliaries can be added. Emulsifying agents such as e.g. sulphonated castor oil, sulphite waste liquor and fatty alcohol sulphonates can be mentioned in particular as distributing agents.

Thus various carriers (such as solvents) and distributing agents are suitable for the application of the active ingredients to the keratine material, depending on the medium and physical state from which the finely distributed active ingredient is applied.

Active ingredients of the formula

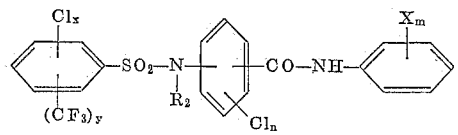

in which $R_2$ is hydrogen or a low alkyl radical, $n$ is a number from 0–3, each X is a chlorine atom or a $CF_3$ group, each of $m$ and $x$ is a number from 1–3 and $y$ is 0 or 1 have proved particularly suitable for use in agents for the protection of keratine material. In the above formula the sum of $m+n+x+y$ should advantageously be at least 4.

EXAMPLE 4

0.5 part of 3-(3'-trifluoromethyl-4'-chlorobenzene sulphonamido)-4-chlorobenzoic acid-2",4",5"-trichloranilide are dissolved with the aid of 10 parts of 0.1 N-caustic soda lye and a little alcohol. This solution is diluted with 3000 parts of water and 100 parts of wool are treated in the liquor so prepared for 15 minutes at about 60°. 5 parts of 10% acetic acid are then added and the treatment is continued at 60° for another hour.

The wool is then rinsed and dried. It is resistant to attack by the larvae of the moth and of the black carpet and furniture carpet beetles.

EXAMPLE 5

2-(3',4'-dichlorobenzene sulphone methylamido)-3,5-dichlorobenzoic acid-3",4"-dichloranilide can be applied, for example, in the following manner:

0.5 part of active ingredient are dissolved in 10 parts of dimethyl formamide and the solution is poured into 3000 parts of water which contains about 1–2 parts of an emulsifer, e.g. sulphonated castor oil.

100 parts of wool are treated for 30 minutes in this liquor at boiling temperature. After rinsing and drying, the wool is moth proof.

Naturally, other additives as well as dyestuffs can be added to the treatment baths described in Examples 4 and 5.

EXAMPLE 6

First a 20% solution of 3-(3',4'-dichlorobenzene sulphone methylamido)-4-chlorobenzoic acid-3"-trifluoromethyl-4"-chloranilide in glycol monomethyl ether is prepared. 10 parts by volume of this solution are diluted with 200 parts by volume of a solvent suitable for dry cleaning, for example, a suitable benzine fraction ("Diluan S"). If desired other additives having a cleansing action can be added. The woollen articles are then treated in this cleaning liquid in the usual way and then centrifuged to a solvent content of about 100% of the weight of the wool. After drying, they are moth proof.

In an analogous manner, the same or analogously composed baths can also be used for the moth proof finishing of untreated or of already otherwise treated or cleaned articles.

Also similar mixtures can be used for spraying of wool in all stages of processing.

The resistance to attack by injurious insects of the keratinous textile materials treated with the compounds according to the first aspect of the invention was tested by the following standard methods:

Moths: SNV Normenblatt No. 95901
Furniture carpet beetle (Anthrenus): SNV Normenblatt No. 95902
Black carpet beetle (Attagenus): AATCC Year Book, 1952, p. 123 and ff.

A second aspect of the invention deals with new compounds of the structural formula

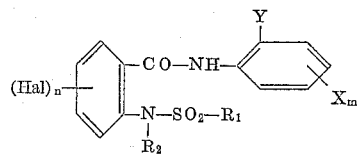

wherein $R_1$ is a lower alkyl radical,
$R_2$ represents a member selected from the group consisting of hydrogen and lower alkyl radicals,
X independently in each occurrence represents a member selected from the group consisting of chlorine, bromine and trifluoromethyl,
$m$ is an integer from 1 to 4,
Y represents a member selected from the group consisting of hydrogen, methyl, lower alkoxy, chlorinated phenoxy and chlorinated phenylmercapto radicals,
Hal represents an atom selected from the group consisting of chlorine and bromine,
$n$ is an integer from 1 to 3, and the total sum of $m+n$ is at least 3 and at most 7.

The novel compounds of this second aspect have an excellent insecticidal activity in particular against insects in all stages of their development which injure keratine material such as moth larvae and larvae of furniture carpet beetle (*Anthrenus vorax*) and black carpet beetle (*Attagenus piceus*).

Preferred compounds of the above Formula VII are those in which "Hal" is chlorine. In this formula, "X" is also advantageously chlorine but when more than one X is present, possibly at least one of them can be the trifluoromethyl group. The action of the trifluoromethyl radical is equivalent to that of a halogen atom so that the one can be exchanged for the other. If the molecule contains a trifluoromethyl radical as substituent X, advantageously other radicals X are chlorine or bromine. Very active compounds are those in which the radical Y is a hydrogen atom, but the radical Y can also advantageously be a methyl or lower alkoxy group such as methoxy and ethoxy.

The radical $R_1$ is advantageously a methyl group, but it can also be other lower alkyl radicals such as ethyl, propyl and butyl. If the radical $R_2$ is not hydrogen, then it can be represented by lower alkyl radicals such as methyl, ethyl, isopropyl and butyl. The total sum of $m+n$ must be more than 2 and, advantageously, should be at least 4.

The new compounds of the Formula VII defined above can be produced by reacting an anthranilic acid arylamide of the general formula

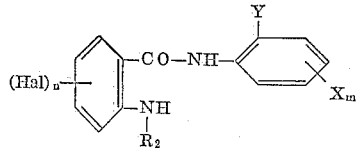

with a reactive functional derivative, in particular a halide, of a sulphonic acid of the general formula

$$R_1\text{—}SO_2\text{—}OH \qquad\qquad IX$$

wherein $R_1$, $R_2$, X, Y, Hal, $n$ and $m$ have the meanings given above. The starting materials are so chosen that in all at least three halogen atoms and/or $CF_3$ groups are contained as ring substituents in the end product; i.e. the sum of $m+n$ is at least 3.

A further process for the production of compounds of the general Formula VII in this second aspect consists in reacting a reactive functional derivative, in particular a halide, of a sulphonyl anthranilic acid of the general formula

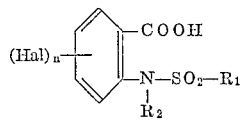

with an amine of the general formula

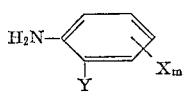

wherein $R_1$, $R_2$, Hal, X, Y, $n$ and $m$ have the meanings given above. The reaction is performed in the presence of an acid binding agent and the starting materials are so chosen that the sum of $m+n$ is at least 3.

In general the pairs of starting materials of the general Formulae VIII and IX or X and XI are so chosen that reaction products are obtained in which the sum of $m+n$ is already at least 3. However, also pairs of starting materials can be used which contain no halogen atoms or only so few that the sum of the halogen atoms and the trifluoromethyl groups present $(m+n)$ is less than 3. The reaction products then obtained which correspond to the general formula

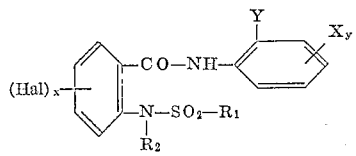

wherein the symbols $R_1$, $R_2$, Hal, X and Y have the meanings given above but the indices $x$ and $y$ represent 0 or only such small numbers that the sum of $x+y$ is less than 3, are treated with chlorine or bromine until so many chlorine or bromine atoms have become ring substituents in the molecule that the total sum of $x+y$ in the end product is greater than 2. If desired, however, also reaction products which already contain the necessary sum $m+n$ $(x+y)$ of at least three halogen atoms and $CF_3$ groups, can be treated with chlorine or bromine in order to increase the halogen content further.

If desired, the reaction products obtained by one of the above processes in which $R_2$ is hydrogen can be reacted in the presence of acid binding agents or after conversion into an alkali compound, with a reactive ester of an aliphatic alcohol, e.g. with an alkyl halide, in order to convert the radical $R_2$ into an alkyl radical.

Starting materials of the general Formula VIII for the first production process in this second aspect are obtained for example from, if desired halogen substituted o-nitrobenzoic acids by converting them into their acid chlorides, reacting the latter with arylamines of the general Formula XI which may be substituted in the nucleus, to form the corresponding o-nitrobenzoic acid arylamides, and reducing these to the corresponding anthranilic acid arylamides. If desired these can also be chlorinated or brominated in the nuclei.

The processes for obtaining starting materials of the general Formula X for the second production process according to this second aspect depend to some extent on the position of the halogen substituents to the amino group of the anthranilic acid. Unsubstituted anthranilic acid and some nuclear halogenated and/or N-monoalkylated anthranilic acids can be acylated by reaction with acid halides of sulphonic acids of the general Formula IX, whereupon the N-acyl derivatives of anthranilic acid, possibly after nuclear halogenation, are converted into reactive functional derivatives with regard to the carboxyl group, e.g. into acid halides.

It is very difficult to N-acylate halogen anthanilic acids having a halogen atom in the o-position to the amino group such as 3,5-dichloranthranilic acid. On the other hand, halogenated anthranilic acids as well as anthranilic acid itself and N-monoalkylated derivatives thereof can be converted by treatment with phosgene into possibly nuclear halogenated and/or N-alkylated isatoic acid anhydrides and these can be reacted with arylamines of the general Formula XI to form starting materials of the general Formula VIII for the first production process. The substances so obtained can then, if desired, be halogenated in the nucleus. The isatoic acid anhydrides necessary for this can be obtained for example also by reacting possibly nuclear halogenated phthalic acid monoamines or imides according to Hoffmann, i.e. isatoic acid anhydrides which are obtained from phthalic acid derivatives but in one instead of two steps, so avoiding the treatment with phosgene.

Examples of suitable starting materials of the general Formula VIII which possibly may also not be halogenated are the defined arylamides of anthranilic acid, 4-chloranthranilic acid, 5-chloranthranilic acid, 3,5-dichloranthranilic acid, 4,5-dichloranthranilic acid, 4,6-dichloranthranilic acid, 3,4,5-trichloranthranilic acid and 3,4,5,6-tetrachloranthranilic acid, 5-bromanthranilic acid, 3,5 - dibromanthranilic acid, N-methyl - 4,5 - dichloranthranilic acid, N-ethyl-4,5-dichloranthranilic acid, N-methyl- and N - ethyl - 3,5 - dichloranthranilic acid, N-methyl- and N - ethyl - 4 - chloranthranilic acid and N-methyl-4,6-dichloranthranilic acid.

The amine components in these amides can be represented for example by the following amines of general Formula XI: aniline, 2-chlor-, 3-chlor- and 4-chlor-aniline, 3,4-dichloraniline and other dichloranilines, 2,4,5-trichloraniline, 3,4,5-trichloraniline, 2,3,4,5-tetrachloraniline 3-chloro-4-bromaniline, 3,4-dibromaniline, 3-trifluoromethyl-4-chloraniline, 2-chloro-5-trifluoromethyl aniline, 2,5-dichloro-4-trifluoromethyl aniline, 2 - methoxy-3,4,5-trichloraniline, 2-methyl-4,5-dichloraniline, mono- and polychlorinated 2-, 3- and 4-amino-diphenyl ether and 4-amino diphenyl sulphides such as e.g. 2-amino-4,4'-dichlorodiphenyl ether, 3-amino-4,4'-dichlorodiphenyl ether, 2-amino-4,2',4',5-tetrachlorodiphenyl ether and 2-amino-4, 5,2',4',6'-pentachlorodiphenyl ether as well as 2-amino-4, 4'-dichlorodiphenyl sulphide.

Examples of reactive functional derivatives of sulphonic acids of the general Formula IX are methane sulphochloride, ethane sulphochloride and butane suphochloride.

Starting materials of the general Formula X are for example the chlorides of anthranilic acids substituted at the nitrogen atom by the radical of a previously named sulphochloride. Examples of anthranilic acids from which such N-sulphonyl derivatives are derived have been given above as acid components of amides of the general Formula VIII. Arylamines of the general Formula XI suitable as starting materials have already been listed as amine components of amides of the general Formula VIII.

Starting materials of the general Formula XII for the third production process mentioned in this second aspect are obtained by reacting together pairs of starting materials of the general Formulae VIII and IX or X and XI, in both of which pairs there are no or only few chlorine atoms as substitutents.

The following examples illustrate the production of the new compounds according to this second aspect of the invention. Parts are given as parts by weight and their relationship to parts by volume is as that of grammes to cubic centimetres. The temperatures are in degrees centigrade.

EXAMPLE 7

(a) *2-Methane Sulphonamido-5-Chlorobenzoic Acid*

171.5 parts of 5-chloranthranilic acid are suspended in 2000 parts of water and 500 parts of 40% caustic soda lye are added. The solution is heated to about 60° until the chloranthranilic acid has completely dissolved and then it is cooled to 10°. 170 parts of methane suphochloride are added dropwise at this temperature. The temperature of the reaction mixture is then allowed to rise to about 20° and it is stirred for some hours at this temperature. The 2-methane sulphonoamido-5-chlorobenzoic acid is then precipitated with concentrated hydrochloric acid. It is filtered off, washed neutral with water and dried at 100° in the vacuum.

The crude product obtained in this way melts at about 185–190°. It can be recrystallised from methanol and water. The pure compound melts at 200–202°.

(b) *2-Methane Sulphonamido-5-Chlorobenzoyl Chloride*

249.5 parts of 2-methane sulphonamido-5-chlorobenzoic acid are suspended in 1000 parts by volume of benzene and 300 parts of phosphorus pentachloride are added at about 40–50°. A complete solution is obtained. As soon as no more hydrochloric acid gas is developed, the mixture is cooled to about 10° whereupon the 2-methane sulphonamido-5-chlorobenzoyl chloride practically completely crystallises out. It is filtered off and washed with petroleum ether. It is dried in the vacuum at about 50° and melts at 131–133°.

(c) *2-Methane Sulphonamido-5-Chlorobenzoic Acid-2',3',4',5'-Tetrachloranilide*

268 parts of 2-methane sulphonamido-5-chlorobenzoyl chloride are dissolved in 2000 parts of benzene and a solution of 462 parts of 2,3,4,5-tetrachloraniline in 1000 parts of benzene is added at room temperature. The mixture is heated at 60° while stirring for 30 minutes and then cooled to room temperature. The product can be worked up as follows: 250 ccm. of 40% caustic soda lye are added dropwise while cooling and the reaction product precipitates from the reaction mixture as the sodium salt. The precipitate is filtered off and dissolved hot in about 3000 parts of water. The solution is clarified with active charcoal and filtered. The product is precipitated from the filtrate by acidifying with concentrated hydrochloric acid. It is washed neutral with water and dried in the vacuum at 80°.

The crude compound melts at about 230–235°. On recrystallising from methyl cellosolve it is obtained in a pure state and then melts at 240–242°.

EXAMPLE 8

(a) *Anthranilic Acid-3,4-Dichloranilide*

162 parts of 3,4-dichloraniline are dissolved in 1000 parts by volume of chlorobenzene. The solution is heated to 60° and at this temperature a solution of 190 parts of o-nitrobenzoyl chloride in 500 parts of chlorobenzene is added dropwise. The reaction mixture is then refluxed until no more hydrochloric acid gas is developed (about 15–20 hours). On cooling, the o-nitrobenzoic acid dichloranilide practically completely precipitates out. It is filtered and dried in the vacuum at 100°. The crude compound melts at 170–175°. The pure product, recrystallised from butanone, melts at 179–181°.

The crude nitro compound obtained in this way can be reduced in the usual manner according to Béchamp, i.e. with iron and acetic or hydrochloric acid.

After recrystallisation from chlorobenzene, the anthranilic acid-3,4-dichloranilide melts at 142–143°.

(b) *2-Amino-3,5-Dichlorobenzoic Acid-3',4'-Dichloranilide*

The anthranilic acid dichloranilide is chlorinated as follows:

281 parts of anthranilic acid dichloranilide are dissolved in 2000 parts of glacial acetic acid and 142 parts of chlorine are introduced slowly at a temperature which does not exceed 40°. A thick paste is obtained which consists of the hydrochloride of 2-amino-3,5-dichlorobenzoic acid-3',4'-dichloranilide. It is filtered under suction and dried at 80° in the vacuum. The hydrochloride can be used direct for the following step. If the free amine is produced by treating the hydrochloric acid salt with caustic soda lye, the crude amine melts at about 185–190°. The pure 2-amino-3,5-dichlorobenzoic acid-3',4'-dichloranilide (after recrystallisation from Cellosolve) melts at 205–206°.

(c) *2-Methane Sulphonamido-3,5-Dichlorobenzoic Acid-3',4'-Dichloranilide*

350 parts of 2-amino-3,5-dichlorobenzoic acid-3',4'-dichloranilide are dissolved in 2000 parts of dioxan or a similar solvent and, at 30–40°, 10% caustic soda lye and a solution of 170 parts of methane sulphochloride in 500 parts of dioxan are added dropwise simultaneously in such a manner that the solution always remains alkaline.

The product is worked up by removing the dioxan by the introduction of steam and diluting the alkaline residue with 5000 parts of water. The solution can be further clarified with active charcoal and filtered. On acidifying with concentrated hydrochloric acid the 2-methane sulphonamido-3,5-dichlorobenzoic acid-3',4'-dichloranilide is precipiptated. It is filtered off, washed neutral with water and dried in the vacuum at about 100°. The crude product melts at about 235–240°.

It can be obtained in a pure state by recrystallising from chlorobenzene whereupon it melts at 248–249°.

(d) *2-Methane Sulphone Methylamido-3,5-Dichlorobenzoic Acid-3',4'-Dichloranilide*

428 parts of 2-methane sulphonamido-3,5-dichlorobenzoic acid-3',4'-dichloranilide are suspended in 3500 parts of water and the reaction is made alkaline with about 100 parts of concentrated (40%) caustic soda lye. The mixture is then heated to about 50° and 300 parts of dimethyl sulphate are added. The mixture is kept continually phenolphthalein alkaline by the slow addition of concentrated caustic soda lye. The reaction product is completely precipitated after some hours. It is filtered off, washed neutral with water and dried in the vacuum at about 100°.

The crude 2-methane sulphone methylamido-3,5-dichlorobenzoic acid-3',4'-dichloranilide produced in this manner melts at about 190–195°. The pure compound can be obtained by recrystallisation from alcohol or benzene. It melts at 204–205°.

EXAMPLE 9

(a) *3,5-Dichlorisatoic Acid Anhydride*

206 parts of 3,5-dichloranthranilic acid are suspended in 1500 parts by volume of chlorobenzene. 150 parts of phosgene are introduced into this suspension at 120°. The reaction mixture is then refluxed for some hours and finally cooled to room temperature. The greater part of the 3,5-dichlorisatoic acid anhydride crystallises out of the chlorobenzene solution and can be filtered off. After drying in the vacuum at about 100° it decomposes at about 250°. A further amount of less pure product can be obtained by concentrating the mother lye.

(b) *2-Amino-3,5-Dichlorobenzoic Acid-3',4',5'-Trichloranilide*

232 parts of 3,5-dichlorisatoic acid anhydride are added at 100° to a solution of 105 parts of 3,4,5-trichloraniline in 2000 parts by volume of chlorobenzene. The reaction mixture is refluxed for 10 hours and then cooled to room temperature whereupon the greater part of the crude 2-amino-3,5-dichlorobenzoic acid-3',4',5'-trichloranilide precipitates. It is filtered off and dried in the vacuum at about 100°. The crude product melts at about 205–210°. The pure compound can be obtained by recrystallisation from chlorobenzene. It then melts at 213–215°.

(c) 2-Methane Sulphonamido-3,5-Dichlorobenzoic Acid-3',4',5'-Trichloranilide The 2-amino-3,5-dichlorobenzoic acid-3',4',5'-trichloranilide is methane sulphonated in exactly the same manner as described in Example 8 under (c).

The crude product obtained in this way melts at about 292–295°. The pure compound which can be obtained by recrystallisation from Cellosolve, melts at 297–298°.

EXAMPLE 10

*Production of 2-Methane Sulphonamido-5-Chlorobenzoic Acid-3',4'-Dichloranilide by Chlorination of 2-Methane Sulphonamido Benzoic Acid-3,4-Dichloranilide*

359 parts of 2-methane sulphonamido benzoic acid-3,4-dichloranilide (M.P. 198–199°) are suspended in 2000 parts of glacial acetic acid and 75 parts of chlorine are introduced at 40–45°. The halogen is easily taken up so that the chlorination can be performed fairly quickly.

The reaction mixture is diluted with water and the chlorination product which precipitates in crystalline form is filtered off under suction and washed with water. After drying in the vacuum at about 100°, it melts at 195–199°. The pure compound can be obtained by recrystallisation from Cellosolve. It melts at 201–203°.

The melting point of the product mixed with the starting material is strongly depressed. Analysis shows that the compound contains three chlorine atoms and it can be shown by break-down reactions that halogen substitution has occurred in the 5-position of the anthranilic acid derivative.

EXAMPLE 11

(a) N-Methyl-4,5-Dichlorisatoic Acid Anhydride 220 parts of N-methyl-4,5-dichloranthranilic acid are dissolved in 2000 parts by volume of chlorobenzene. 150 parts of phosgene are slowly introduced at 120° and then the reaction mixture is refluxed until the hydrochloric acid development is complete (about 5 hours). On cooling, the greater part of the N-methyl-4,5-dichlorisatoic acid anhydride crystallises out. It is filtered off and washed with chlorobenzene and with petroleum ether. After drying at about 100° in the vacuum it melts at 196–198°.

(b) N-Methyl-4,5-Dichloranthranilic Acid-3',4'-Dichloranilide 244 parts of N-methyl-4,5-dichlorisatoic acid anhydride and 162 parts of 3,4-dichloraniline in 1500 parts of chlorobenzene are refluxed. The $CO_2$ development is completed after about 2 hours. The reaction mixture is then cooled to room temperature whereupon the greater part of the reaction product precipitates. It is filtered off and washed first with chlorobenzene and then with petroleum ether. After drying in the vacuum at about 100°, the crude N-methyl-4,5-dichloranthranilic acid-3',4'-dichloranilide melts at about 250–255°. It can be recrystallised from Cellosolve and then melts at 257–258°.

(c) 2-(Methane Sulphone Methylamido)-4,5-Dichlorobenzoic Acid-3',4'-Dichloranilide 364 parts of N-methyl-4,5-dichloranthranilic acid-3',4'-dichloranilide are dissolved with 1000 parts of dioxan and 500 parts of 20% caustic soda lye. 170 parts of methane sulphochloride are then slowly added dropwise at 40–50°. The reaction mixture is then stirred for 1 hour at about 40° and then cooled to room temperature. On acidifying with concentrated hydrochloric acid the greater part of the reaction product precipitates and can be filtered off. It is washed first with a little dioxan and then with water until the reaction is neutral. After drying at about 100° in the vacuum, the crude product melts at about 180–185°. After recrystallisation from chlorobenzene, the pure compound melts at 185–186°.

The following compounds for example can be produced in an analogues manner to those described in the above examples; all melting points are given in degrees centigrade.

2-methane sulphonamido-5-chlorobenzoic acid-3'-chloro-4'-bromanilide, M.P. 211–213°,
2-methane sulphonamido-5-chlorobenzoic acid-3',4',5'-trichloranilide, M.P. 240–242°,
2-methane sulphonamido-5-chlorobenzoic acid-2',4'-dichloro-5'-trifluoromethyl anilide, M.P. 195–198°,
2-methane sulphonamido-5-chlorobenzoic acid-2',4',5'-trichloranilide, M.P. 198–200°,
2-methane sulphonamido-4-chlorobenzoic acid-3',4'-dichloranilide, M.P. 255–257°,
2-methane sulphonamido-3,5-dichlorobenzoic acid-2'-methoxy-3',4',5'-trichloranilide, M.P. 240–241°,
2-methane sulphonamido-3,5-dichlorobenzoic acid-2',3',4',5'-tetrachloranilide, M.P. 280–282°,
2-methane sulphonamido-3,5-dichlorobenzoic acid-4'-chloranilide, M.P. 270–271°,
2-methane sulphonamido-3,5-dichlorobenzoic acid-3'-chloro-4'-bromanilide, M.P. 268–269.5°,
2-methane sulphonamido-3,5-dichlorobenzoic acid-2',4',5'-trichloranilide, M.P. 274–275°,
2-methane sulphonamido-3,5-dichlorobenzoic acid-3'-trifluoromethyl-4'-chloranilide, M.P. 237–238°,
2-methane sulphonamido-3,5-dichlorobenzoic acid-2'-(4''-chlorophenoxy)-5'-chloranilide, M.P. 206–207°,
2-(methane sulphone-methylamido)-3,5-dichlorobenzoic acid-2',4',5'-trichloranilide, M.P. 150–151°,
2-(methane sulphone-methylamido)-3,5-dichlorobenzoic acid-2'(4''-chlorophenoxy)-5'-chloranilide, M.P. 173–175°,
2-(methane sulphone-ethylamido)-3,5-dichlorobenzoic acid-3',4'-dichloranilide, M.P. 143–144°,
2-(methane sulphone-isopropylamido)-3,5-dichlorobenzoic acid-3',4'-dichloranilide, M.P. 150–151°,
2 - methane sulphonamido-3,5-dichlorobenzoic acid-2'-(2'',4'',5''-trichlorophenoxy)-5'-chloranilide, M.P. 210–212°,
2 - methane sulphonamido-3,5-dichlorobenzoic acid-2'-(2'',4'',6''-trichlorophenoxy)-4',5'-dichloranilide, M.P. 247–249°,
2-methane sulphonamido-3,5-dichlorobenzoic acid-2'(4''-chlorophenylmercapto)-5'-chloranilide, M.P. 236–238°,
2-methane sulphonamido-4,5-dichlorobenzoic acid-3',4'-dichloranilide, M.P. 228–230°,
2-methane sulphonamido-4,5-dichlorobenzoic acid-2',4',5'-trichloranilide, M.P. 178–180°,
2-methane sulphonamido-4,5-dichlorobenzoic acid-3',4',5'-trichloranilide, M.P. 271–272°,
2-ethane sulphonamido-3,5-dichlorobenzoic acid-3',4'-dichloranilide, M.P. 257–258°,
2-methane sulphonamido-3,5-dichlorobenzoic acid-2'-methyl-4',5'-dichloranilide, M.P. 216–218°,
2-(methane sulphone-n-butylamido)-3,5-dichlorobenzoic acid-3',4'-dichloranilide, M.P. 169–171°,
2-methane sulphonamido-3,5-dichlorobenzoic acid-2'-chloro-5'-trifluoromethyl anilide, M.P. 268–270°,
2-n-butane sulphonamido-3,5-dichlorobenzoic acid-3',4'-dichloranilide, M.P. 224–226°,
2-methane sulphonamido-3,4,5-trichlorobenzoic acid-3',4'-dichloranilide, M.P. 267–269°,
2-methane sulphonamido-5-bromobenzoic acid-3',4'-dichloranilide, M.P. 195–197°,
2-methane sulphonamido-3,5-dibromobenzoic acid-3',4'-dichloranilide, M.P. 238–240°.

The compounds of Formula VII which can be produced according to the processes described in this second aspect can be used according to the usual methods for textile finishing. They have considerable affinity to keratine material and are excellently suitable, therefore, for the protection of keratine material against injurious insects, in particular for the wash and moth proof finishing of such materials both in the raw as well as in the processed state, for example of raw or processed sheep's wool as well as other animal hairs, fells and furs. In addition to the wash and moth proof finishing in the dyebath, the compounds can also be used for the impregnation of wool or woollen articles the materials then becoming equally excellently moth proofed.

In addition to their insecticidal action on the larvae of the clothes moth, the compounds of Formula VII are also active against the larvae of the black carpet and furniture carpet beetles so that the textiles, such as woollen blankets, woollen carpets, woollen underwear, woollen clothes and knitted goods treated with the compounds according to this second aspect by one or the other of these methods, are protected from all types of insects which are injurious to keratine material.

The agents used for the protection of keratine material against attack by injurious insects should contain the active ingredients of the Formula VII in a finely distributed form. Thus, solutions, suspensions and emulsions of the active ingredients should be used.

Insofar as the active ingredients contain a hydrogen atom in the sulphonamide group, i.e. when $R_2$ is a hydrogen atom, in the form of their alkali metal salts they have good water solubility. They can be applied to the keratine material direct from these aqueous solutions either by dipping the material for a shorter or longer time in the alkali metal salt solutions, or spraying them with the solutions, or by treating them in the solutions at a raised temperature as in dyeing processes.

Compounds having no dissociating hydrogen atom in the sulphonamide group can be drawn onto the material to be protected for example from their aqueous suspensions or emulsions, advantageously at a raised temperature, or such suspensions or emulsions can be used for spraying the material.

Because of their improved solubility in organic solvents, these compounds of Formula VII are particularly well suited for application from non-aqueous media. Thus the materials to be protected can simply be impregnated with these solutions or, if a suitable solvent is chosen, the moth proof finishing can be combined with a dry cleaning process.

Propylene glycol, methyl Cellosolve, ethyl Cellosolve and dimethyl formamide have proved to be particularly suitable organic solvents to which distributing agents and/or other auxiliaries can be added. Emulsifying agents such as e.g. sulphonated castor oil, sulphite waste liquor and fatty alcohol sulphonates can be mentioned in particular as distributing agents.

Thus various carriers (such as solvents) and distributing agents are suitable for the application of the active ingredients to the keratine material, depending on the medium and physical state from which the finely distributed active ingredient is applied.

Active ingredients of the formula

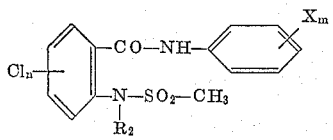

in which $R_2$ is hydrogen or a low alkyl radical, $n$ is a number from 1 to 4, each X is a halogen atom or a $CF_3$ group, $m$ is a number from 1 to 4 and the sum of $m+n$ is greater than 2 and advantageously at least 4, have proved particularly suitable according to this second aspect, for use in agents for the protection of keratine materials.

EXAMPLE 12

0.5 part of 2-methane sulphonamido-3,5-dichlorobenzoic acid-3',4'-dichloranilide are dissolved with the aid of 10 parts of 0.1 N-caustic soda lye and a little alcohol. This solution is diluted with 3000 parts of water and 100 parts of wool are treated in the liquor so prepared for 15 minutes at about 60°. 5 parts of 10% acetic acid are then added and the treatment is continued at 60° for a further hour.

The wool is then tested and dried in the usual way. It is resistant to attack by the larvae of the moth, and of the black carpet and furniture carpet beetles.

EXAMPLE 13

2-(methane sulphone methylamido)-3,5 - dichlorobenzoic acid 3',4'-dichloranilide can be applied, for example, in the following manner:

0.5 part of active ingredient are dissolved in 10 parts of dimethyl formamide and the solution is poured into 3000 parts of water which contains about 1–2 parts of an emulsifier, e.g. sulphonated castor oil.

100 parts of wool are treated for 30 minutes in this liquor at boiling temperature. After rinsing and drying, the wool is moth proof.

Naturally, other additives as well as dyestuffs can be added to the treatment baths described in Examples 12 and 13.

EXAMPLE 14

First a 20% solution of 2-(methane sulphone isopropylamido)-3,5-dichlorobenzoic acid-3',4' - dichloranilide in glycol monomethyl ether is prepared. 10 parts by volume of this solution are diluted with 200 parts by volume of a solvent suitable for dry cleaning, for example a suitable benzine fraction ("Diluan S"). If desired, other additives having a cleansing action can be added. The woollen articles are then treated in this cleaning liquid in the usual way and then centrifuged to a solvent content of about 100% of the weight of the wool. After drying, they are moth proof.

In an analogous manner, the same or analogously composed baths can also be used for the moth proof finishing of untreated or of already otherwise treated or cleaned articles.

Also similar mixtures can be used for spraying of wool in all stages of processing.

The resistance to attack by injurious insects of the keratinous textile materials treated with the compounds according to this second aspect of the invention was tested by the following standard methods:

Moths: SNV-Normenblatt No. 95901
Furniture carpet beetle (Anthrenus): SNV-Normenblatt No. 95902
Black carpet beetle (Attagenus): AATCC Year Book, 1952, p. 123 and ff.

The instant application is a continuation-in-part of application Ser. No. 780,688, filed December 16, 1958, and of application Ser. No. 779,554, filed December 11, 1958 (both abandoned since the filing of the present application).

What we claim is:
1. A compound of the formula

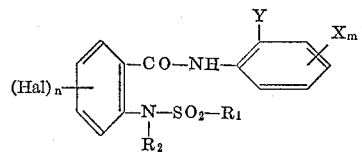

wherein $R_1$ is lower alkyl,
$R_2$ represents a member selected from the group consisting of hydrogen and lower alkyl,
X in each occurrence represents a member selected from the group consisting of chlorine, bromine and trifluoromethyl,
$m$ is an integer from 1 to 4,
Y represents a member selected from the group consisting of hydrogen, methyl, lower alkoxy, chlorophenoxy and chlorophenylmercapto, Hal represents an atom selected from the group consisting of chlorine and bromine, n is an integer from 1 to 3, and the total sum of $m+n$ is at least 3 and at most 7.

2. The compound 2-methane sulphonamido-3,5-dichlorobenzoic acid-3',4'-dichloranilide.

3. The compound 2-methane sulphonamido-3,5-dichlorobenzoic acid-3',4',5'-trichloranilide.

4. The compound 2-methane sulphonamido-3,5-dichlorobenzoic acid-2',3',4',5'-tetrachloranilide.

5. The compound 2-(methane sulphone-N-methylamido)-3,5-dichlorobenzoic acid-3',4'-dichloranilide.

6. The compound 2-ethane sulphonamido-3,5-dichlorobenzoic acid-3',4'-dichloranilide.

7. The compound 2-methane sulphonamido-3,5-dichlorobenzoic acid-3'-trifluoromethyl-4'-chloranilide.

8. The compound 2-methane sulphonamido-4,5-dichlorobenzoic acid-3',4'-dichloranilide.

9. The compound 2-methane sulphonamido-4,5-dichlorobenzoic acid-3',4',5'-trichloranilide.

10. The compound 3-(3'-trifluoromethyl-4'-chlorobenzene sulphonamido)-4-chlorobenzoic acid-2",4",5"-trichloranilide.

11. The compound 3-(3'-trifluoromethyl-4'-chlorobenzene sulphonamido)-4,6-dichlorobenzoic acid-2",4",5"-trichloranilide.

References Cited in the file of this patent
FOREIGN PATENTS
890,883 Germany _____ Sept. 24, 1953

OTHER REFERENCES

Beilstein's Handbuch der Organischen Chemi, 4th ed., vol. 14, page 362, system No. 1092, Verlag von Julius Springer, Berlin, Germany (1931).

Frear et al.: J. of Economic Entomology, vol. 40, No. 5, pages 736–741 (1947).

Heacock et al.: J. Chem. Soc., 1953, part 1, pages 3–8.

Bottger et al.: USDA Bulletin No. E-789, pages 1 to 2 and 17 to 21 (November 1959).